United States Patent [19]

Cowgill et al.

[11] 4,044,237

[45] Aug. 23, 1977

[54] MISSILE MANEUVER CONCEPT

[75] Inventors: Paul N. Cowgill, Bellevue, Wash.; John L. Pearson, Fountain Valley, Calif.

[73] Assignee: The United States of America as represented by the Secretary of the Army, Washington, D.C.

[21] Appl. No.: 667,819

[22] Filed: Mar. 16, 1976

[51] Int. Cl.² .................. G06F 15/50; F42B 15/02
[52] U.S. Cl. ..................... 235/150.27; 235/150.25; 244/3.15; 244/3.2
[58] Field of Search ........... 235/150.2, 150.25, 150.26, 235/150.27; 244/3.1, 3.15, 3.2, 3.21, 3.23, 77 R, 77 D, 77 B, 77 G, 77 SS, 79

[56] References Cited

U.S. PATENT DOCUMENTS

| 3,301,508 | 1/1967 | Yamron | 244/3.2 X |
| 3,369,772 | 2/1968 | Eberlein | 244/3.2 |
| 3,547,381 | 12/1970 | Shaw et al. | 235/150.25 X |
| 3,746,281 | 7/1973 | Stripling | 244/3.2 |
| 3,951,358 | 4/1976 | DeLano et al. | 244/3.15 |

Primary Examiner—Joseph F. Ruggiero
Attorney, Agent, or Firm—William G. Gapcynski; Lawrence A. Neureither; Robert C. Sims

[57] ABSTRACT

A lifting body missile is controlled by pitch and roll commands wherein the yaw autopilot is caused to change in accordance with the roll and estimated angle of attack input information. A command logic is provided to determine the polarity of the command signals to the autopilot.

2 Claims, 2 Drawing Figures

MISSILE MANEUVER CONCEPT

BACKGROUND OF THE INVENTION

In the past, high-performance missile configurations have been constrained almost exclusively to bodies of revolution employing cruciform control. The desire to utilize the higher maneuver-duty-cycle capability (g-sec) of lifting bodies presents the problem of controlling their nonlinear, cross-coupled motions. The unique feature of lifting-body control is the requirement to align one missile-maneuver plane with the desired inertial-maneuver direction. Hence, high-performance roll maneuvers are required that meet such criteria as time response, etc. Cruciform control techniques using arbitrary maneuver directions are obviously not suitable for lifting bodies where the high-lift missile plane must be used for efficient maneuver performance.

Some problems in lifting-body control design are: (1) crosscoupling terms are difficult to suppress and are sometimes destabilizing, (2) nonlinearities make conventional linear design procedures less valid, and (3) to meet response-time criteria, roll-control torque requirements may be quite large. The roll-torque penalty is striking if required roll capability for cruciform and lifting-body control are compared on a configuration suited for cruciform control. For typical lifting bodies, a reduced yaw-control requirement and increased roll-moment arm tend to reduce the total control-force penalty.

The cross-coupling phenomena may be divided into four categories, according to source: (1) geometric, (2) gyroscopic, (3) control induced, and (4) aerodynamic. Categories 1 and 2 are important because of high roll rates. Categories 3 and 4 are configuration dependent. Of particular interest in terms of performance is yaw/roll aerodynamic coupling. Without proper yaw-autopilot maneuver strategy, roll-maneuver time is significantly increased by this phenomenon.

DESCRIPTION OF THE PREFERRED EMBODIMENT

The prime function of the control system is to maneuver the vehicle to achieve the commanded acceleration and inertial roll angle, as computed by the airborne guidance system. The secondary function of the control system is to maintain vehicle stability as critical plant parameters vary during transition through the flight environment. These basic functions are preformed by a control system. The control system receives acceleration, roll angular error, and gain commands from the airborne guidance system based on ground guidance acceleration magnitude, roll position, and gain commands.

Because of the elliptical cone shape of the UPSTAGE vehicle (see FIG. 2), the maneuver strategy which best achieves the desired results is to achieve the acceleration command with the high lift (flat) side of the ellipse. This is defined as a pitch plane maneuver. The acceleration vector is steered by rolling the vehicle to align the acceleration vector in the commanded direction. The control system must perform the maneuver in as short a time as possible, minimize overshoot, and keep residual errors in acceleration and angular position at a minimum. The control system incorporates a number of body mounted instruments to obtain essential inertial information. These instruments include a three axis laser angular rate sensor and four accelerometers (not shown). Control mechanism actuation status is also monitored and used by the control system. The instrument and command signals are blended and filtered by the autopilot shaping networks to provide signal conditioning and autopilot stabilization. The resultant control signals provide commands to the control mechanism logic which converts the analog control signals to discrete control mechanism actuation signals.

The bank-to-turn control system differs from cruciform control in that there is no symmetry between the steering axes as there is in cruciform control. Bank-to-turn requires steering with the pitch axis and roll axis while decoupling the steering axes via yaw control. Further, the coupling between pitch and roll can be very strong. Inadequate yaw control quickly lends to unsatisfactory pitch and roll control. Throughout the UPSTAGE program the pitch control system has been viewed as one control problem, and the yaw-roll system as another. That pattern will be adhered to in the following.

To clarify the contrast between cruciform and lifting-body control, it may be explained that in cruciform control, pitch-and yaw controllers are used to steer the vehicle. Often, roll control is employed only to decouple the steering axes. On the other hand in lifting-body control, pitch and roll are the steering axes. The primary function of the yaw axis control is to decouple the steering axes.

Figure 1:
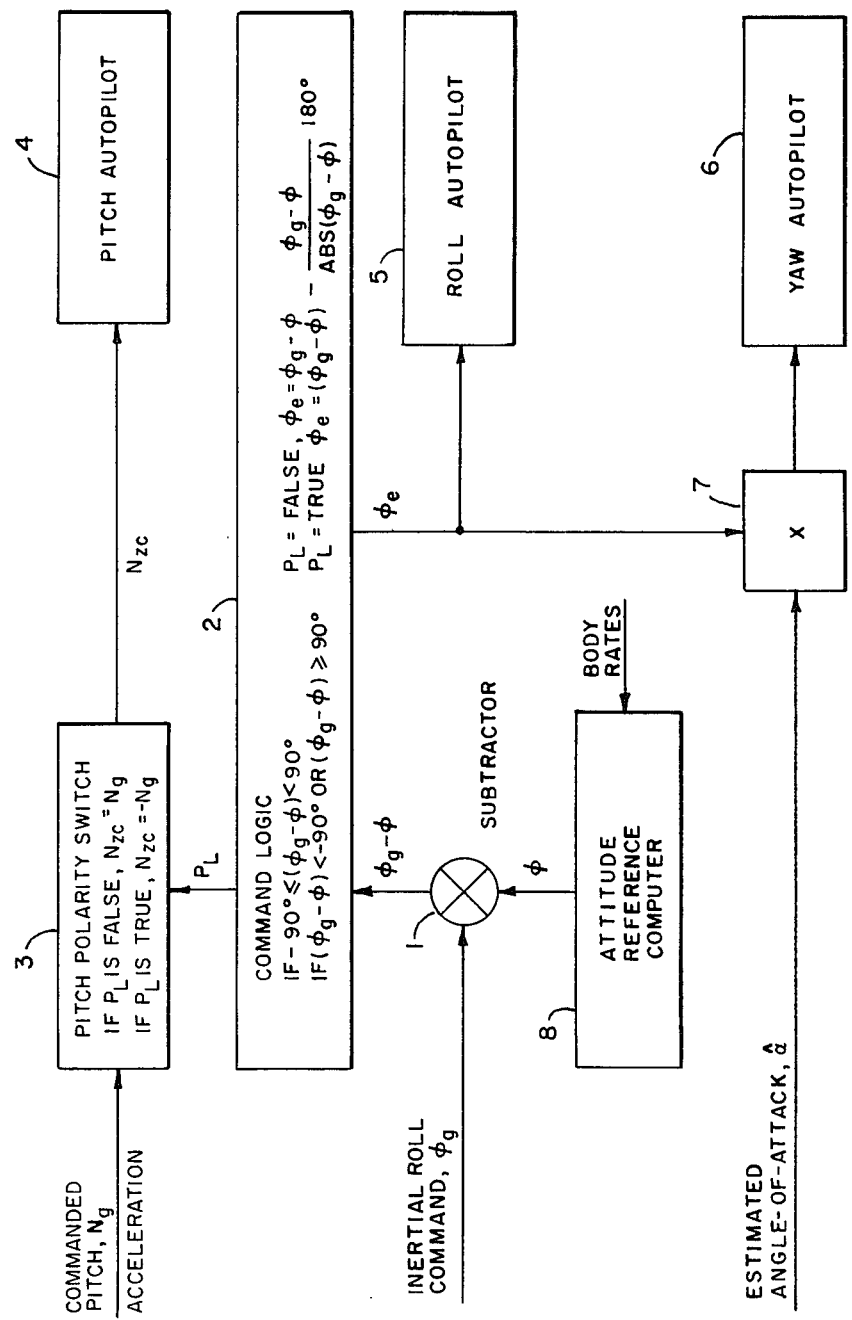
FIG. 1 is a block diagram illustrating the preferred embodiment of the invention.

The UPSTAGE Control System shown in FIG. 1 consists of three autopilots 4, 5 and 6, each controlling one of the three vehicle axes, pitch, roll or yaw, and sufficient command and control logic to effectively control a lifting body. The control system is specifically designed to overcome the strong aerodynamic and geometric coupling between controlled axes. In general, it is the nature of the coupling to directly resist any change of vehicle conditions, and/or to induce a disturbance in the control of one axis when the state of one or both the remaining axes is changed.

The command and control logic 2 initiates a maneuver in such a way that the aerodynamic coupling moments generated aid the desired maneuver. The desired maneuver can thus be completed in less total time and with less control effort than when the desired maneuver is commanded directly. In addition, roll activity is minimized by command logic 2 which executes either a commanded maneuver to a specified amplitude and direction on the pitch axis oriented to a specified inertial roll angle or a maneuver to the specified amplitude but oppositely sensed on the pitch axis, coupled with a roll maneuver through the supplemental change in roll angle. These two maneuvers result in an identical inertial maneuver. The logic chooses the maneuver requiring the smallest roll angular change.

The commands are transmitted in polar coordinates rather than the conventional Cartesian form. Thus, the command is sent as a maneuver magnitude $N_g$ to be achieved at an inertial roll angle $\phi_c$. Based on the difference between the present vehicle roll attitude $\phi$ and $\phi_c$ the command and control logic 2 selects the smaller of the two angle $(\phi_{c-\phi})$ or $(180° - \phi_{c+\phi})$ and issues this angle as an error signal $\phi_e$ to the roll and yaw autopilots.

Based on the angle decision, the command and control logic 2 sets the sign of the command magnitude and transmits this signed command to the pitch autopilot 4.

Figure 2:
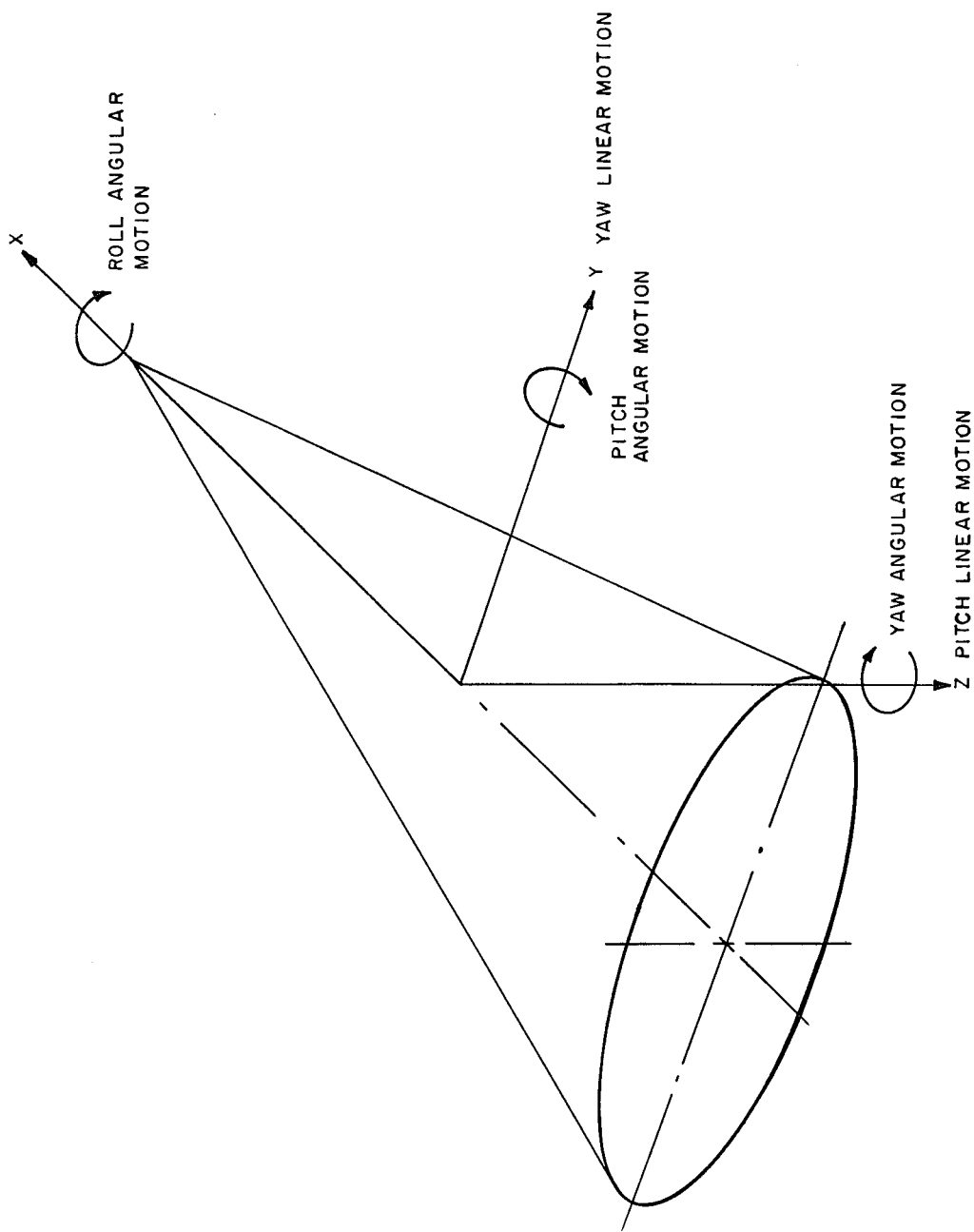
FIG. 2 is a diagrammatic showing of the coordinate system of the missile.

A yaw command is computed based on present vehicle state, and the roll maneuver to be executed, and is sensed so as to aid the commanded roll maneuver. The coordinate system used in the following discussion is shown in FIG. 2. A complete cycle of operation is as follows. The inertial roll command $\phi_g$ is received and compared to the vehicle's present inertial roll attitude $\phi$ by the subtractor 1. The roll error magnitude $|\phi_g - \phi|$ is tested and found to be greater than or less than 90° as the first operation of the command logic 2.

1. If $|\phi_g - \phi|$ is less than 90°, that is $-90° \leq \phi_g - \phi < 90°$, the command logic 2 sets the roll angle error $\phi_e$ to $\phi_g - \phi$ and $P_L$ to false.

2. If $|\phi_g - \phi|$ is greater than 90°, that is $\phi_g - \phi < -90°$ or $\phi_g - \phi \geq 90°$, the command logic 2 sets the roll angle error $\phi_e$ to the supplement of $$\phi_g - \phi (\phi_e = \phi_g - \phi - \frac{(\phi_g - \phi)}{|\phi_g - \phi|} 180°)$$

and sets $P_L$ to true.

The command $\phi_g$, the vehicle inertial angle $\phi$, computed by the attitude reference computer 8, the comparison in the subtractor 1 and the manipulations in the command logic 2 are all handled computationally so that $\phi_g$, $\phi$, and $\phi_g - \phi$ always lie between $-180°$ and $+180°$, and $\phi_e$ always lies between $-90°$ and $+90°$. Thus, no ambiguities exist in the manipulations of 1 and 2.

The pitch command $N_g$ is received by the pitch polarity switch 3. $N_g$ is always a positive number. If the comparison of 2 results in $P_L$ being false, the polarity switch 3 sets the pitch command $N_{zc}$ equal to $N_g$. If the comparison of 2 results in $P_L$ being true, the polarity switch 3 sets the pitch command $N_{zc}$ equal to $-N_g$.

The pitch command $N_{zc}$ is set to the pitch autopilot 4 and executed. The roll angle error $\phi_e$ is sent to the roll autopilot 5 and executed. The above manipulations of the commands assure minimum roll activity since the roll error angle is always less than or equal to 90° in magnitude.

The roll angle error $\phi_e$ is also sent to a multiplier 7 where it is multiplied by the vehicle estimated angle of attack $\alpha$. This product (the output of multiplier 7) is the acceleration command applied to a yaw autopilot 6. In executing the commanded yaw acceleration, a yaw angle-of-side-slip is generated which aids the concurrent rolll maneuver via the strong lifting body yaw-roll aerodynamic coupling. That is, the roll moment aerodynamically induced by the yaw angle-of-side-slip accelerates the vehicle about the roll axis in the desired roll direction, aiding the roll maneuver.

The maneuvers about the three vehicle axes, pitch, yaw, and roll, are executed simultaneously. The computed yaw command varies as the maneuver progresses, returning to zero when the roll angle error $\phi_e$ is reduced to zero.

The command logic 2 may take the form of any of the well known logic devices properly programmed in accordance with the information given. The computer 8, multiplier 7, pitch polarity switch 3, and autopilots 4–6 may be the same as any of the well known devices. The vehicle shown in FIG. 2 may be any of the known missiles or vehicles which have a favorite axis along which aerodynamic lift can be generated.

We claim:

1. A system for controlling a missile having a lifting body configuration comprising a pitch autopilot having an input; a roll autopilot having an input; a yaw autopilot having an input; a pitch polarity switch having an output connected to the pitch autopilot input; logic device having first and second input and an output; an attitude reference device having output which is indicative of the attitude of said missile; pitch control signal connected to an input of said pitch polarity switch; subtractor having two inputs and an output; roll command signal connected to one input of said subtractor; the output of said attitude device being connected to the other input of said subtractor; the output of subtractor being connected to said logic device whereby said logic device will set the polarity of said pitch polarity switch; said logic device further having said second output connected to said roll autopilot; said logic determining the polarity of the signal applied to said roll autopilot; a multiplier having first and second inputs and an output; and estimated angle of attack of said missile vehicle signal being fed into one input of said multiplier; said second output of said logic device being fed to the other input of said multiplier; and said output of said multiplier being connected to said yaw autopilot.

2. A system as set forth in claim 1 wherein said attitude device has an input thereto fed by body rates of the missile.

* * * * *